United States Patent
Gardner et al.

(10) Patent No.: US 12,209,200 B2
(45) Date of Patent: Jan. 28, 2025

(54) SEMICRYSTALLINE PULVERULENT POLYARYLETHERSULFONES AND METHOD TO MAKE THEM

(71) Applicant: LUMAS Polymers LLC, Chaska, MN (US)

(72) Inventors: Thomas George Gardner, Chanhassen, MN (US); John Gordon Eue, St. Louis Park, MN (US)

(73) Assignee: Lumas Polymers LLC, Chaska, MN (US)

( * ) Notice: Subject to any disclaimer, the term of this patent is extended or adjusted under 35 U.S.C. 154(b) by 183 days.

(21) Appl. No.: 17/583,671

(22) Filed: Jan. 25, 2022

(65) Prior Publication Data

US 2022/0251416 A1    Aug. 11, 2022

Related U.S. Application Data

(60) Provisional application No. 63/147,822, filed on Feb. 10, 2021.

(51) Int. Cl.

| | | |
|---|---|---|
| *C08G 75/23* | (2006.01) | |
| *B29C 64/153* | (2017.01) | |
| *B29C 64/314* | (2017.01) | |
| *B33Y 10/00* | (2015.01) | |
| *B33Y 40/10* | (2020.01) | |
| *B33Y 70/00* | (2020.01) | |
| *C08J 3/09* | (2006.01) | |
| *C08J 3/11* | (2006.01) | |
| *C09D 181/06* | (2006.01) | |

(52) U.S. Cl.
CPC .......... *C09D 181/06* (2013.01); *B29C 64/153* (2017.08); *B29C 64/314* (2017.08); *B33Y 10/00* (2014.12); *B33Y 40/10* (2020.01); *B33Y 70/00* (2014.12); *C08G 75/23* (2013.01); *C08J 3/093* (2013.01); *C08J 3/11* (2013.01); *B29K 2995/004* (2013.01); *C08G 2250/00* (2013.01)

(58) Field of Classification Search
None
See application file for complete search history.

(56) References Cited

U.S. PATENT DOCUMENTS

| | | |
|---|---|---|
| 5,121,329 A | 6/1992 | Crump |
| 5,503,785 A | 4/1996 | Crump et al. |
| 5,597,589 A | 1/1997 | Deckard |
| 5,612,425 A | 3/1997 | Weber et al. |
| 6,197,924 B1 | 3/2001 | Takekoshi |
| 2007/0049724 A1 | 3/2007 | Brunelle et al. |
| 2007/0117962 A1 | 5/2007 | Steiger et al. |
| 2007/0219344 A1 | 9/2007 | Steiger et al. |
| 2013/0109831 A1* | 5/2013 | Lutz ............ C08G 65/00 528/174 |

FOREIGN PATENT DOCUMENTS

| | | | |
|---|---|---|---|
| CN | 111 205 452 A | * | 5/2020 |
| EP | 1640403 A2 | | 3/2006 |
| EP | 3587470 A1 | | 1/2020 |
| WO | 2016071088 A1 | | 5/2016 |
| WO | 2018197156 A1 | | 11/2018 |
| WO | 2020006061 A1 | | 1/2020 |

OTHER PUBLICATIONS

International Search Report and Written Opinion issued in co-pending International Application PCT/US2022/013653, mailed May 20, 2022 (12 pages).

* cited by examiner

*Primary Examiner* — Mohammad M Ameen

(74) *Attorney, Agent, or Firm* — Young Basile Hanlon & MacFarlane, P.C.

(57) ABSTRACT

A semicrystalline polyarylethersulfone (PAES) useful for additive manufacturing may be made by a method comprising: dissolving an amorphous polyarylethersulfone in a polar aprotic halogenated hydrocarbon solvent at a temperature adequate to effectively form a solution, and subsequently and spontaneously bring about reprecipitation of a semicrystalline polyarylethersulfone from the solution. The semicrystalline polyarylethersulfone may have a crystallinity of at least 30% by weight. The semicrystalline PAES, upon being heated, melting and uniting together in layers during additive manufacturing cools without substantially recrystallizing, allows for deformation-free articles to be formed having low residual stress.

20 Claims, 3 Drawing Sheets

SEMICRYSTALLINE PULVERULENT POLYARYLETHERSULFONES AND METHOD TO MAKE THEM

FIELD

The invention relates to semicrystalline pulverulent polyarylethersulfones (PAES), methods to make, and their use in additive manufacturing.

BACKGROUND

Additive manufacturing, also known as three-dimensional (3D) printing, constitutes a significant advance in the development of not only printing technologies, but also of experimental, prototyping, and product development capabilities. 3D printing allows for the formation of physical objects of virtually any geometry.

Typically, an object to be built is created virtually as a 3D digitally-modeled image using computer-aided design (CAD) software. The object model is virtually "sliced" into thin layers, which ultimately provide parameters of how the model will be physically built by the 3D printer. This virtual slicing is needed because conventional methods of 3D-printing involve a print head that successively deposits material in thin layers according to the geometry of the modeled image based on the printing parameters for each layer. In common filament-based methods (e.g., fused filament fabrication "FFF", see for example, U.S. Pat. Nos. 5,121,329 and 5,503,785), a print head deposits heated material (e.g., thermoplastic polymer) while moving in multiple linear directions parallel to the printer base, while the base or print head moves stepwise in the vertical dimension away from each other. The print head continues depositing the material until the final, uppermost layer of the object has been deposited and the object is thus fully formed.

Powder-based methods of additive manufacturing include the following: Selective laser sintering (SLS) is a 3D-printing technique that uses a laser to fuse powder material in successive layers (see, for example, U.S. Pat. No. 5,597,589). High-speed sintering (HSS) and multi-jet fusion (MJF) 3D-printing employ multiple jets that similarly deposit successive layers of infrared-absorbing (IR-absorbing) ink onto powder material, followed by exposure to IR (infra-red) energy for selective melting of the powder layer. Electrophotographic 3D-printing employs a rotating photoconductor that builds the object layer-by-layer from the base.

Selective laser sintering (SLS), multi-jet fusion (MJF), and high-speed sintering (HSS) 3D-printing methods use the same type of free-floating, non-fixed powder bed. They generally have the same material requirements for compatibility with the printing process since the additively built object will experience similar stresses, only with different heating mechanisms to obtain the melt phase. Typically, a free-body diagram of a 3D printed object can be used to determine the residual stresses expected in the printed object. This is necessary for successfully building the object. If the residual stress is too high, the object will deform or be deformed beyond acceptable tolerances.

The residual stresses have typically been minimized for these powder bed-based 3D printers by using crystalline or semicrystalline thermoplastic polymers having sufficiently large window between its melting temperature and its recrystallization temperature. Unfortunately, this has limited the polymers that have successfully used to print large or complex parts using SLS and MJF methods (e.g., polyamides), thus limiting the use of these additive manufacturing methods.

Accordingly, it would be desirable to provide a thermoplastic polymer that avoids one or more problems to produce additive manufactured articles by methods such as SLS, HSS, MJF and the like such as those described above. In particular, it would be desirable to provide a thermoplastic polymer that may provide a high strength, tough, high temperature resistant, flame retardant and in some cases optically transparent article.

SUMMARY

Applicants have discovered a process where a polyarylethersulfone ("PAES") with low crystallinity (less than about 30% by weight) and desirably amorphous may form a semicrystalline PAES that surprisingly has higher crystallinity (e.g., greater than about 30% to essentially crystalline). Surprisingly, this semicrystalline PAES, when used in an additive manufacturing by a process such as SLS, HSS or MJF, largely avoids the problems of residual stresses and deformation. This is, without being limiting, believed to be due to the PAES of the invention melting at a distinct temperature, but upon cooling, failing to recrystallize to any significant extent (e.g., less than 5% crystallinity or essentially amorphous) while also displaying a sufficiently wide gap between melting and glass transition temperature ($T_g$) that allows for relaxation of the polymer during cooling without incursion of substantial residual stresses or deformation.

A first aspect of the invention is a method of forming a semicrystalline polyarylethersulfone comprising: (i) dissolving an initial polyarylethersulfone that is amorphous or has a crystallinity of less than about 30% by weight in a polar aprotic halogenated hydrocarbon solvent at a temperature to form a solution, and (ii) allowing the precipitation of the polyarylethersulfone from the solution to form the semicrystalline polyarylethersulfone, wherein, when the initial polyarylethersulfone is amorphous the semicrystalline polyarylethersulfone has a crystallinity of at least about 10% to about 100% and when the initial polyarylethersulfone has a crystallinity of less than 30%, the crystallinity of the semicrystalline polyarylethersulfone is at least about 20% greater than the crystallinity of the initial polyarylethersulfone.

A second aspect of the invention is a polyaryethersulfone having a crystallinity of greater than 30% to 100% by volume.

A third aspect of the invention is a method of forming an article comprising heating the polyarylethersulfone of the first or second aspect above its melting temperature and shaping said polyarylethersulfone into the article.

A fourth aspect of the invention is an additive manufactured article comprised of a plurality of fused polyarylethersulfone layers, wherein the polyarylethersulfone has a halogen concentration of about 0.1% to about a trace.

A fifth aspect of the invention is a polyarylethersulfone comprising:

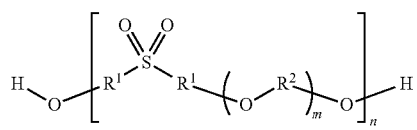

wherein n is an integer value such that the weight average molecular weight is about 30 to 1000 kDa, m is from 0 to 10, $R^1$ is an aryl group having from 5 to 10 carbons, $R^2$ in each occurrence is independently $C_1$-$C_{20}$ alkyl, $C_5$-$C_{12}$ aryl or fused ring of 5-10 carbon atoms, and said polyarylethersulfone has a crystallinity that is at least 10%.

The semicrystalline PAES of the invention may be used to make articles and in particular additive manufactured articles for applications utilizing the properties of PAES polymers (e.g., heat resistance and chemical resistance) such as biocompatible (medical), plumbing, aerospace, and automotive applications.

DETAILED DESCRIPTION

Figure 1:
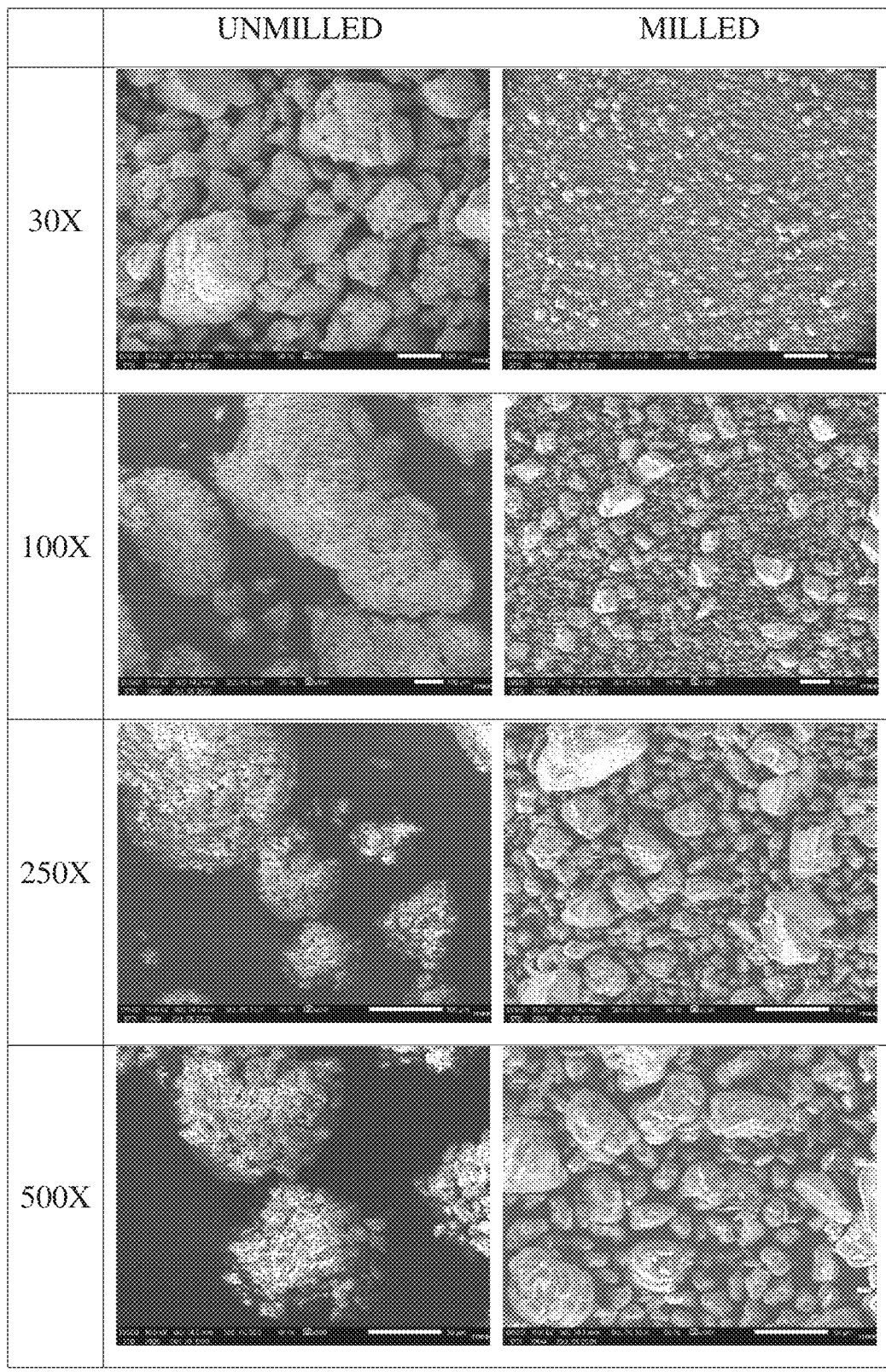
FIG. 1 is a series of differing magnification of powders of the polyarylethersulfone of this invention prior to and after being cryomilled.

The explanations and illustrations presented herein are intended to acquaint others skilled in the art with the invention, its principles, and its practical application. The specific embodiments of the present disclosure as set forth are not intended to be exhaustive or limit the scope of the disclosure.

One or more as used herein means that at least one, or more than one, of the recited components may be used as disclosed. It is understood that the functionality of any ingredient or component may be an average functionality due to imperfections in raw materials, incomplete conversion of the reactants and formation of by-products.

As described above, it has been discovered that amorphous or low crystallinity polyarylethersulfones (PAES), when dissolved in solvents, may undergo spontaneous precipitation, wherein the precipitated semicrystalline PAES may have a crystallinity above about 30% by weight.

In an embodiment, the PAES that is dissolved is amorphous and spontaneously precipitates to form the semicrystalline PAES when heated, melted and cooled, the semicrystalline PAES reverts to an amorphous PAES. This behavior is particularly useful in additive manufacturing as described herein. For such semicrystalline PAES the crystallinity may be any useful crystallinity, but desirably the crystallinity is as describe elsewhere herein.

In another embodiment, the initial PAES may have some crystallinity, but upon dissolution and precipitation, the crystallinity of the precipitated semicrystalline PAES has a crystallinity that is at least increased by 20%, 30%, 40% or 50% compared to the initial PAES and the crystallinity of the semicrystalline PAES desirably being anywhere from above 30%, 40%, or 45% to 55%, 60%, 70%, 80%, 90% or essentially crystalline. The initial crystallinity of the low crystallinity PAES typically is less than 30%, 25%, 20%, 15%, 10% to some trace amount of crystallinity such as at least about 0.1% or 1% crystallinity determined as described herein.

Typically, a the PAES may be represented by:

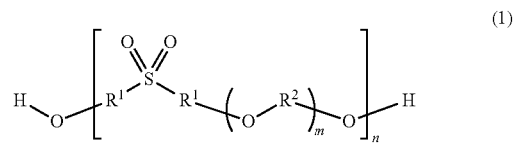

wherein n is any integer value that gives rise to the PAES having an weight average molecular weight ($M_w$) anywhere from 1, 10, or 20 to 1000, 500 or 200 kDa, m typically varies from 0 to 10, each occurrence of $R^1$ represents an aromatic ring or fused rings of about 5-10 carbon atoms, such as but not limited to: 1,2-, 1,3-, or 1,4-phenylene, or a diphenylene such as but not limited to 4,4'-diphenylene, and each occurrence of $R^2$ is independently $C_1$-$C_{20}$ alkyl, $C_5$-$C_{18}$ or $C_5$-$C_{12}$ aromatic ring or fused rings consisting of 5-10 carbon atoms, or a combination thereof. The fragment structure —$R^1$—S($=$O)$_2$—$R^1$— may also represent either of the fused heterocyclic ring structures shown in formulas 2 and 3; and wherein at least 60% of the total number of $R^1$ groups are aromatic, or each $R^2$ contains at least one $C_{6-30}$ aromatic group. The fragment structure —$R^1$—S($=$O)$_2$—$R^1$— may also represent either of the fused heterocyclic ring structures shown in formulas 2 and 3:

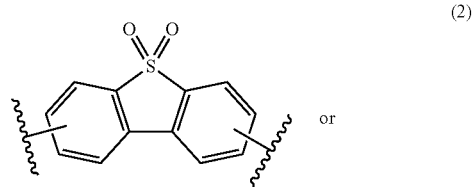

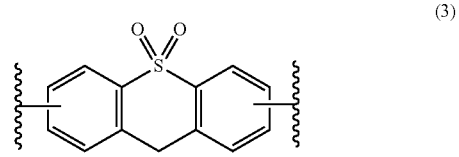

In an embodiment $R^1$ and $R^2$ may be the residue of an aryl or diaryl compound:

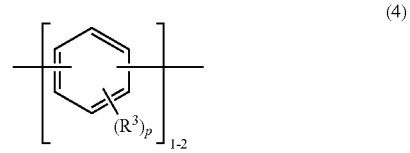

In another embodiment, the PAES of formula (1), m has an integer value greater than or equal to zero (typically from 1 to 10, 6, 5, 4, 3, or 2), and each $R^2$ is a residue of a dihydroxy compound such as an aromatic dihydroxy compound:

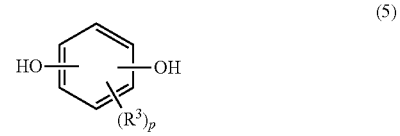

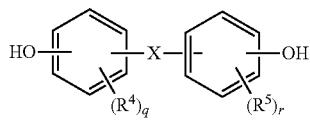

(6)

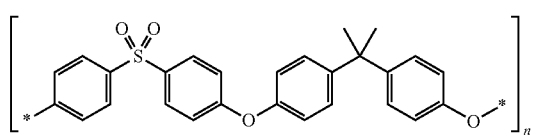

(10)

In formulas (3), (4), and (5), each $R^3$, $R^4$, and $R^5$ is independently, for example, but not limited to: a halogen atom (e.g., chlorine or bromine), a $C_{3-20}$ alkoxy, a $C_{1-20}$ hydrocarbyl group (e.g., a $C_{1-20}$ alkyl, a halogen-substituted $C_{1-10}$ alkyl, a $C_{6-10}$ aryl, or a halogen-substituted $C_{6-10}$ aryl); and p, q, and r are each independently integers of 0 to 4, such that when p, q, or r is less than 4, the valence of each unsubstituted carbon of the ring is filled by hydrogen; and X represents a bridging group connecting the two phenolic groups, where the bridging group and the hydroxy substituent of each $C_6$ arylene group are disposed ortho, meta, or para (preferably para) to each other on the $C_6$ arylene group, and the X group consists of, for example: a single bond; —O—; —S—; —S(=O)—; —S(=O)$_2$— (e.g., bisphenol-S); —C(=O)—; or a $C_{1-20}$ organic group, which can be cyclic or acyclic, aromatic or non-aromatic, and can further comprise heteroatoms such as: halogens; oxygen; nitrogen; sulfur; silicon; or phosphorous.

Specific dihydroxy compounds include but are not limited to: resorcinol; 2,2-bis(4-hydroxyphenyl)propane ("bisphenol A" or "BPA", in which in which each of aryl rings is para-substituted and X is isopropylidene in formula (3)); 3,3-bis(4-hydroxyphenyl)-phthalimidine; 2-phenyl-3,3-bis(4-hydroxyphenyl)phthalimidine (also known as "N-phenyl phenolphthalein bisphenol", "PPPBP", or 3,3-bis(4-hydroxyphenyl)-2-phenylisoindolin-1-one); 1,1-bis(4-hydroxy-3-methylphenyl)cyclohexane; 1,1-bis(4-hydroxy-3-methylphenyl)-3,3,5-trimethylcyclohexane (also known as "isophorone bisphenol").

Examples of polyarylethersulfones that are suitable may any one or more of:

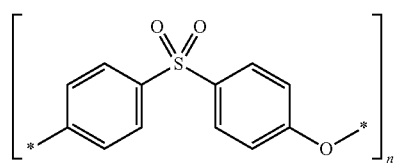

(7)

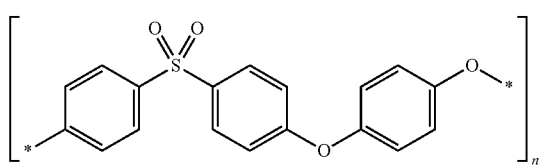

(8)

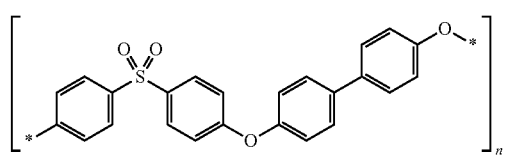

(9)

Examples of useful PAES polymers are: polyethersulfone (PSU, CAS #25667-42, formula 7), poly(1,4-phenylene-ether-ether-sulfone (PES or PEES, CAS #28212-68-2, formula 8), polyphenylenesulfone (PPSU, CAS #25839-81-0, formula 9) and poly(bisphenol-A sulfone) (PSF, CAS #25135-51-7, formula 10), such as are available under the tradenames RADEL from Curbel Plastics Inc., Arlington Tex., PARYLS from UJU New Materials, Ltd., and UDEL from Solvay Specialty Polymers USA, LLC, Alpharetta, Ga.

The amorphous PAES is dissolved in an aprotic polar halogenated hydrocarbon solvent at a temperature, and is subsequently allowed to precipitate. The precipitation is performed at a consistent temperature throughout the dissolution and reprecipitation (i.e., within ±5° C.); however, the precipitation may be facilitated by cooling the solution, if so desired. In other words, the precipitation is allowed to occur spontaneously. It is understood that the temperature may fluctuate merely by the dissolution of the initial PAES and precipitation of the semicrystalline PAES. Spontaneous means that no external applied means of precipitation is employed, such as addition of non-solvent, seeding, or cooling. It is contemplated that if heating is applied to facilitate the dissolution of the Initial PAES, that any cooling is slow and does not exceed the cooling arising from merely allowing the solution to cool under ambient conditions. In another embodiment, the cooling rate may be accelerated by cooling, for example, to change the particle size or morphology of the precipitated particles. In an embodiment, the dissolution and reprecipitation is performed at ambient conditions (~20° C. to ~30° C. and around atmospheric pressure) without any applied heating or cooling. The dissolution and precipitation may be performed in a closed system to limit volatile solvent losses and facilitate recovery of the solvent.

To facilitate the dissolving of the initial PAES, it may be crushed, cut, shredded, pulverized, or reduced in size by any suitable method such as those known in the art. Desirably, the dissolving and precipitating is performed under agitation. Any suitable method of agitation may be used such as those known in the art, including, for example, the use of impellers, magnetic stirrers, homogenizers, colloid mills, ultrasonic agitation, cavitation and the like to realize the desired shear. Examples of useful agitation may be realized by any commercially available mixers.

It is appreciated that the level of shear (e.g., rotation rate of the stirrer) and the cooling rate of the reactor may be modified to affect the particle size of the precipitated PAES. For example, faster stirring may result in smaller particles compared to slower stirring, and a faster cooling rate may result in smaller particles compared to a slower cooling rate.

As described above, it has been discovered that the initial PAES, which is desirably amorphous, when dissolved in an aprotic polar halogenated hydrocarbon solvent, it may precipitate spontaneously to form the PAES of the invention. Illustrative halogenated aprotic polar halogenated hydrocarbon solvents may be, for example, halogenated aliphatic or halogenated aromatic hydrocarbons and in particular, those having at most about 6 carbon atoms, or aromatic compounds that include one or more halogen atoms in the structure. In particular, the halogenated hydrocarbon may be a chlorinated hydrocarbon and in particular a chlorinated alkane or alkene such as chloromethane, dichloromethane, trichloromethane, 1,2-dichloroethane, or 1,1,1-trichloroethane, or a chlorinated arene such as but not limited to chlorobenzene, 1,2-dichlorobenzene, 1,3-dichlorobenzene, or 1,2,3-trichlorobenzene, or any combination thereof. In a particular embodiment, the solvent is dichloromethane that is used at ambient conditions with no applied cooling or heating.

Typically, the temperature of dissolving may be any temperature below the boiling point of the solvent to its freezing point. Generally, the temperature is from 20° C. to about 60° C. or 40° C. and to reiterate may be desirably held constant (within 5° C.) during the dissolving and precipitating. The time for dissolution may be any time and may range from 2 or 3 minutes, 30 minutes, 60 minutes to 24 hours, 10 hours, 5 hours or 2 hours. The precipitation may occur in the same time frame. The pressure as previously mentioned may be ambient or any useful pressure and is desirably performed in closed system to facilitate recovery of the solvent and minimize volatile losses to the environment.

The precipitated semicrystalline PAES may be separated from the solvent by any suitable method such as those known in the art. Exemplary methods may be one or more of screening, filtration, settling and decanting which may be accelerated with centrifugation, evaporation or sublimation of the solvent (e.g., heating with or without application of vacuum or freeze drying) or any combination in series or parallel. Even though the semicrystalline PAES is separated from the solvent, invariably a small amount remains, such as about 0.1%, 500 ppm (parts per million), 250 ppm, 100 ppm 10 ppm to about a trace amount (~1 ppb) by weight, which may be determined by the amount of halogen present in the semicrystalline PAES by known techniques such as inductive coupled plasma (ICP) mass spectrometry techniques. In an embodiment, the initial PAES, which is preferably amorphous, is halogen free (i.e., has no halogen substituents) and the semicrystalline PAES that is formed has the amount of halogen described above and desirably the halogen is chlorine arising, for example, from any residual halogenated solvent used in performing the method of this invention.

The method may further comprise the comminution of the resultant semi-crystalline PAES. The comminution may be carried out by any suitable method such as those known in the art. Illustratively, milling at a temperature where the semi-crystalline PAES becomes embrittled may be used such as commonly referred to as cryomilling. Generally, the temperature for cryomilling may be any temperature below about 0° C., −25° C., −50° C. to about −75° C., −100° C., −150° C., or −190° C. In an embodiment, the cooling is provided by using dry ice or liquid nitrogen.

The semicrystalline PAES of the invention has a crystallinity of at least about 30% by weight to essentially crystalline, with higher degrees of crystallinity being more desirable. Desirably, the crystallinity is anywhere from 35%, 40% or 45% to essentially crystalline, 90%, 80%, 75%, 60% or 55%. The crystallinity may be determined by any suitable methods such as those known in the art. Illustratively, the percent crystallinity may be determined by x-ray diffraction including, for example, wide angle x-ray diffraction (WAXD), such as by using a Rigaku SmartLab x-ray diffractometer, or by differential scanning calorimetry (DSC), such as by using a TA Instruments DSC250 differential scanning calorimeter ASTM D3418-15.

The semicrystalline PAES desirably has a particle size that is useful for making additive manufactured articles, and typically has a median particle size ($D_{50}$), by volume, from about 1 micrometer (μm), 10 μm, 20 μm or 30 μm to 150 μm, 125 μm, 100 μm or 90 μm. Likewise, to enable consistent heating and fusion of the powder, it desirably has a $D_{90}$ of at most 300 μm, 200 μm or 150 μm and a $D_{10}$ of at least 0.1 μm, 0.5 μm or 1 μm by volume. $D_{90}$ means the particle size (equivalent spherical diameter) in the particle size distribution, where 90% by volume of the particles are less than or equal to that size; similarly, $D_{50}$ means the particle size (equivalent spherical diameter) in the particle size distribution, where at least 50% by volume of the particles are less than that size, and $D_{10}$ means the particle size (equivalent spherical diameter) in the particle size distribution, where at least 10% by volume of the particles are less than that size. The particle size may be determined by any suitable method such as those known in the art including, for example, laser diffraction or image analysis of micrographs of a sufficient number of particles (~100 to ~200 particles). A representative laser diffractometer is one produced by Microtrac such as the Microtrac S3500.

It has been discovered that the semicrystalline PAES made by the method of the invention allows for the formation of shaped articles that do not deform or possess undesirable amounts of residual stress. For example, but not limited to, the semicrystalline PAES may be made into a body by an additive manufacturing method such as SLS, MJF, HSS or electrophotography. Illustratively, in SLS, a layer of semicrystalline PAES powder is deposited on a bed at a fixed temperature below the melting temperature of the powder and a predetermined (selected) area of the bed is sintered (fused) together using a heating source such as a laser controlled and directed as described above. Layers are then in succession deposited and sintered to the preceding layer and within the layer to build up an additive manufactured part.

Surprisingly, the semicrystalline powder melts, fuses together and then substantially does not recrystallize allowing for a part that does not deform or have undesirable amounts of residual stresses within the layer and in particular between the layers of additive manufactured part. It is believed this unique feature, without being limiting, allows for a large operating window coupled with a distinct melting temperature. The "operating window" is the temperature difference between the onset temperature at which the material melts (melting point, "$T_m$") to the onset temperature at which it recrystallizes ("$T_c$") or the $T_g$ temperature of an amorphous polymer. Since semicrystalline PAES of the invention have a well-defined melting behavior (compared to an amorphous PAES of the same composition which does not exhibit melting behavior) upon heating but does not significantly crystallize and the $T_g$ temperature is substantially lower than the melting point, the PAES of the invention is surprisingly useful for additive manufacturing methods and parts produced thereby. Typically, the operating window is anywhere from 10° C., 15° C., or 20° C. to 100° C., 50° C., 30° C., or 25° C.

Upon cooling from melting, as mentioned above, the semicrystalline PAES substantially does not recrystallize. Substantially, does not recrystallize means that the crystallinity after melting and cooling is at most 5% to a trace of the crystallinity of the semicrystalline PAES (i.e., prior to melting) or essentially amorphous. Typically, the crystallinity after forming an article (e.g., additive manufactured article) by heating above the melting point of the semicrystalline PAES, is at most about 5%, 2% or 1% to amorphous, with amorphous being preferred.

In an embodiment of the invention, the semicrystalline PAES is used to make an additive manufactured article comprised of a plurality of fused PAES layers, wherein the PAES used to make the additive article is the semicrystalline PAES of the invention as described above. In other words, the PAES is one that has an amount of halogen, arising from the halogenated hydrocarbon solvent as described above.

ILLUSTRATIVE EMBODIMENTS

Embodiment 1. A method of forming a semicrystalline polyarylethersulfone comprising:
(i) dissolving an initial polyarylethersulfone that is amorphous or has a crystallinity of less than about 30% by weight in a polar aprotic halogenated hydrocarbon solvent at a temperature to form a solution, and
(ii) precipitating the polyarylethersulfone from the solution to form the semicrystalline polyarylethersulfone, wherein, when the initial polyarylethersulfone is amorphous the semicrystalline polyarylethersulfone has a crystallinity of at least about 10% to about 100% and when the initial polyarylethersulfone has a crystallinity of less than 30%, the crystallinity of the semicrystalline polyarylethersulfone is at least about 20% greater than the crystallinity of the initial polyarylethersulfone.

Embodiment 2. The method of Embodiment 1, wherein the method is performed at about the same temperature throughout the method.

Embodiment 3. The method of either Embodiment 1 or 2, wherein the polyarylethersulfone spontaneously precipitates from the solution.

Embodiment 4. The method of any one of Embodiments 2 to 3, wherein the temperature is from about 20° C. to about 60° C.

Embodiment 5. The method of any one of Embodiments 2 to 4, wherein the solvent is comprised of a halogenated hydrocarbon have from 1 to 3 carbons.

Embodiment 6. The method of Embodiment 5, wherein the halogenated hydrocarbon is a haloalkane.

Embodiment 7. The method of any one of the previous Embodiments, wherein the solvent is comprised of a chloroalkane.

Embodiment 8. The method of Embodiment 7, wherein the solvent is comprised of dichloromethane.

Embodiment 9. The method of any one of the preceding Embodiments, wherein the dissolving and precipitating is performed at ambient conditions.

Embodiment 10. The method of any one of the preceding Embodiments, wherein the initial polyarylethersulfone has a crystallinity of at most 15% by weight.

Embodiment 11. The method of any one of the preceding Embodiments, wherein initial polyarylethersulfone is essentially amorphous.

Embodiment 12. The method of any one of the preceding Embodiments, wherein the initial polyarylethersulfone is comprised of one represented by:

$$H-O-\left[R^1-\overset{\overset{O}{\|}}{\underset{\underset{O}{\|}}{S}}-R^1-\left(O-R^2\right)_m-O\right]_n-H$$

wherein n is an integer value such that the weight average molecular weight is about 30 to 200 kDa, m is from 0 to 10, $R^1$ is an aryl group having from 5 to 10 carbons, $R^2$ in each occurrence is independently $C_1$-$C_{20}$ alkyl, $C_5$-$C_{18}$ aryl or fused ring of 5-10 carbon atoms.

Embodiment 13. The method of Embodiment 12, wherein —$R^1$—S(═O)$_2$—$R^1$— is represented by:

[chemical structures] or

Embodiment 14. The method of either Embodiment 12 or 13, wherein $R^2$ is independently $C_1$-$C_{20}$ alkyl, $C_5$-$C_{12}$ aryl or fused ring of 5-10 carbon atoms.

Embodiment 15. The method of any one of the preceding Embodiments, wherein the semicrystalline polyarylethersulfone has a crystallinity of greater than 30% to 60% by weight.

Embodiment 16. The method of Embodiment 15, wherein the semicrystalline polyarylethersulfone has a crystallinity of 40% to 55% by weight.

Embodiment 17. The method of any one of the preceding Embodiments further comprising milling the semicrystalline polyarylethersulfone.

Embodiment 18. The method of Embodiment 17, wherein the milling is performed at a temperature where the semicrystalline polyarylethersulfone is brittle.

Embodiment 19. The method of Embodiment 18, wherein the temperature of milling is less than −75° C.

Embodiment 20. The method of any one of the preceding Embodiments, wherein the solvent is removed such that the semicrystalline polyarylethersulfone has at most about 0.5% to a trace amount of solvent.

Embodiment 21. The method of Embodiment 20, wherein the solvent is a solvent containing a halogen and the amount of halogen in the semicrystalline polyarylethersulfone is about 0.1% to a trace amount.

Embodiment 22. The method of Embodiment 21, wherein the halogen is chlorine.

Embodiment 23. A polyarylethersulfone having a crystallinity of greater than 30% to 100% by weight.

Embodiment 24. The polyarylethersulfone of Embodiment 23, wherein the crystallinity is 35% to 60% by weight.

Embodiment 25. The polyarylethersulfone of Embodiment 24, wherein the crystallinity is about 45% to 55%.

Embodiment 26. The polyarylethersulfone of any one of Embodiments 23 to 25, wherein the polyarylethersulfone is comprised of one represented by:

$$H-O-\left[R^1-\overset{\overset{O}{\|}}{\underset{\underset{O}{\|}}{S}}-R^1-\left(O-R^2\right)_m-O\right]_n-H$$

wherein n is an integer value such that the weight average molecular weight is about 30 to 200 kDa, m is from 0 to 10, $R^1$ is an aryl group having from 5 to 10 carbons, $R^2$ in each occurrence is independently $C_1$-$C_{20}$ alkyl, $C_5$-$C_{18}$ aryl or fused ring of 5-10 carbon atoms.

Embodiment 27. The polyarylethersulfone of Embodiment 26, wherein $R^2$ is $C_5$ to $C_{12}$ aryl group and m is at least 1.

Embodiment 28. The polyarylethersulfone of either Embodiment 26 or 27, wherein $R^1$ is a phenylene group.

Embodiment 29. The polyarylethersulfone of any one of Embodiments 23 to 28, wherein the polyarylethersulfone is poly(1,4-phenylene ether-ether-sulfone), polyphenylenesulfone, polyethersulfone, poly(bisphenol-A sulfone) or mixture thereof.

Embodiment 30. The polyarylethersulfone of any one of Embodiments 23-29, wherein the polyarylethersulfone is a powder having a D90 particle size of at most 150 micrometers equivalent spherical diameter.

Embodiment 31. The polyarylethersulfone of any one of Embodiments 23-30, wherein the polyarylethersulfone has an average particle diameter of about 1 micrometer to 100 micrometers by volume.

Embodiment 32. The polyarylethersulfone of Embodiment 31, wherein the average particle diameter is about 30 micrometers to about 90 micrometers.

Embodiment 33. The polyarylethersulfone of any one of Embodiment 23 to 32, wherein the polyarylethersulfone has an amount of halogen of 0.1% to a trace by weight.

Embodiment 34. The polyarylethersulfone of Embodiment 33, wherein the halogen is chlorine.

Embodiment 35. A method of forming an article comprising heating the polyarylethersulfone of any one of Embodiments 23 to 34 above its melting temperature and shaping said polyarylethersulfone into the article.

Embodiment 36. The method of Embodiment 35, wherein the shaping is by additive manufacturing.

Embodiment 37. The method of Embodiment 36, wherein the additive manufacturing method is comprised of selectively fusing by directed melting of powders of polyarylethersulfone from a powder bed of said powders.

Embodiment 38. An additive manufactured article comprised of a plurality of fused polyarylethersulfone layers, wherein the polyarylethersulfone has a halogen concentration of about 0.1% to about a trace.

Embodiment 39. The additive manufactured article of Embodiment 38, wherein the halogen is chlorine.

Embodiment 40. The additive manufactured article of either Embodiment 38 or 39, wherein the polyarylethersulfone is comprised of one that is represented by:

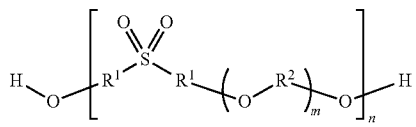

wherein n is an integer value such that the weight average molecular weight is about 30 to 200 kDa, m is from 0 to 10, $R^1$ is an aryl group having from 5 to 10 carbons, $R^2$ in each occurrence is independently $C_1$-$C_{20}$ alkyl, $C_5$-$C_{18}$ aryl or fused ring of 5-10 carbon atoms.

Embodiment 41. The method of Embodiment 40, wherein $R^2$ is the $C_5$-$C_{18}$ aryl and m is at least 1.

Embodiment 42. The method of Embodiment 41, wherein $R^2$ is the $C_5$-$C_{12}$ aryl.

Embodiment 43. The method of any one of Embodiments 38 to 42, wherein the polyarylethersulfone is poly(1,4-phenylene ether-ether-sulfone), polyphenylenesulfone, polyethersulfone, poly(bisphenol-A sulfone), or mixture thereof.

Embodiment 44. A polyarylethersulfone of comprising a polyarylethersulfone represented by:

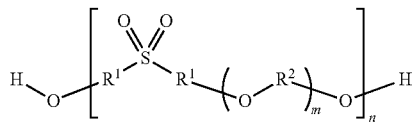

wherein n is an integer value such that the weight average molecular weight is about 30 to 1000 kDa, m is from 0 to 10, $R^1$ is an aryl group having from 5 to 10 carbons, $R^2$ in each occurrence is independently $C_1$-$C_{20}$ alkyl, $C_5$-$C_{12}$ aryl or fused ring of 5-10 carbon atoms and said polyarylethersulfone has a crystallinity that is at least 10%.

Embodiment 45. The polyarylethersulfone of Embodiment 44, wherein upon melting and cooling, the crystallinity of the polyarylethersulfone drops below 5% by weight.

Embodiment 46. The polyarylethersulfone of Embodiment 45, wherein after melting and cooling the polyarylethersulfone is essentially amorphous.

EXAMPLES

The following example is provided to illustrate the method to form the PAES of the invention. All parts and percentages are by weight unless otherwise noted.

Example 1

To a 20-L glass reactor vessel fitted with a pneumatically-driven overhead stirrer and charged with 15 L of dichloromethane ("DCM", ≥99.5% stabilized ACS, BDH) was gradually added to 2.25 kg polyphenylethersulfone ("PPSU", Paryls F1250 or F1350, UJU New Materials, Ltd.) in pellet form. The mixture was stirred at ambient temperature and pressure at a rate of 180 rpm to yield a solution of polyphenylethersulfone in DCM after approximately 1.5 hours. Precipitation of the PPSU powder began within 2 hours after dissolution was complete and was essentially complete after an additional 10-12 hours forming a slurry. The slurry was filtered to obtain a powder that was wet with dichloromethane and was dried either in air, in a convection oven, in a vacuum oven, or in a microwave vacuum oven. It is also possible to directly evaporate the dichloromethane solvent from the slurry, for example with a rotary evaporator apparatus, to more fully recover the solvent for re-use.

The semicrystalline PPSU powder obtained from the precipitation process was cryomilled (e.g., in an Alpine pin mill) using liquid nitrogen and sieved through a 150 μm screen before use in SLS printing.

Density and Flowability. Average bulk density of cryomilled semicrystalline PPSU powder prepared in this embodiment was measured, for example using a Ray-Ran Apparent Bulk Density Apparatus, to be 0.59 g/cm³ (ASTM D7481-18—bulk & tap density) Average tap density after 2000 taps was measured, for example using a Quantachrome Dual Autotap, to be 0.76 g/cm³ (average Hausner ratio=1.30, Carr's index 23.0). Average density of the milled powder by gas pycnometry was measured, for example with an AccuPyc 1340 gas (helium) pycnometer, to be 1.35 g/cm³

(ASTM D5965-19). Angle of repose was measured, for example with Copley Scientific BEP2 powder flowability tester, to be 30.4° (ASTM D6393-14). Avalanche angle was measured, for example using a Mercury Scientific Revolution powder analyzer, to be 48.6±3.9°; dynamic density was determined to be 0.55 g/cm$^3$; and surface fractal was determined to be 2.73±35%.

Figure 2:
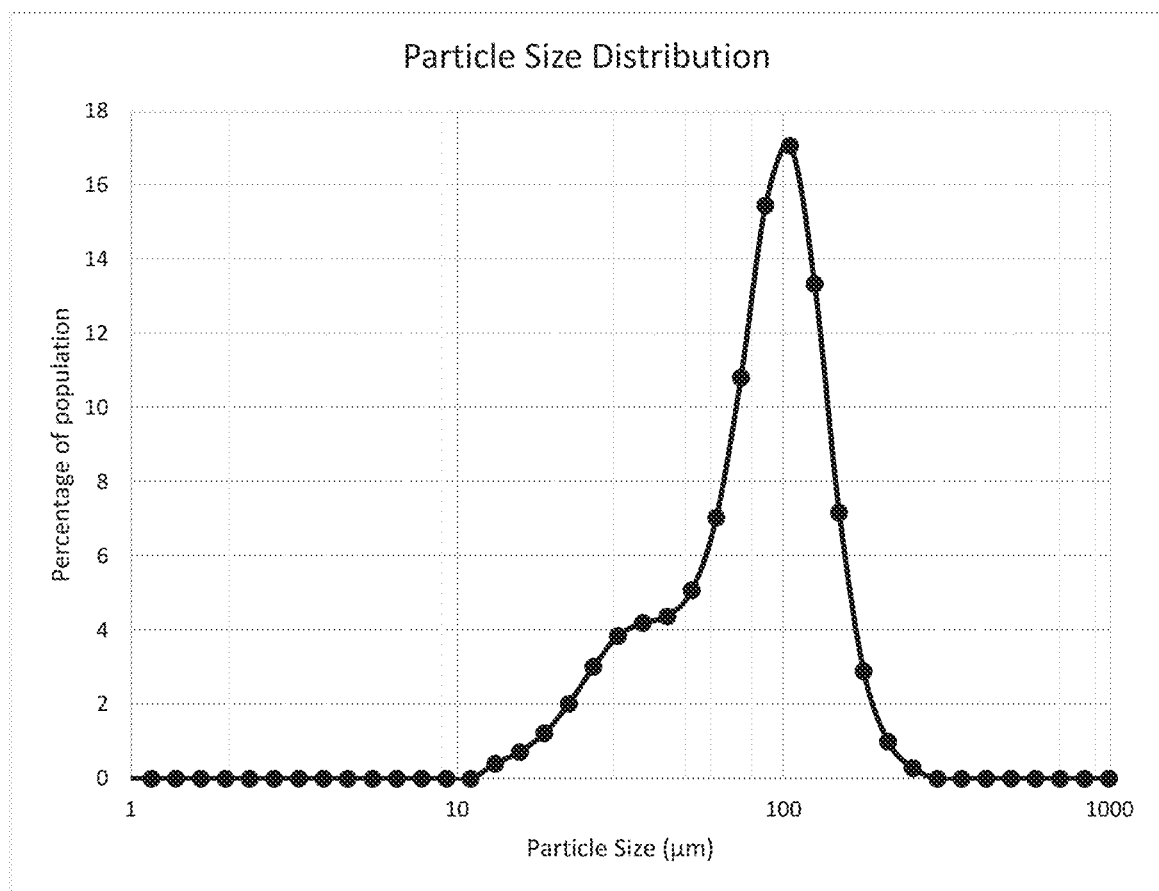
FIG. 2 is a volume plot of the particle size of the polyarylethersulfone after being milled.

Particle size and distribution (PSD). PSD of cryomilled PPSU powder was determined in air using a Microtrac S3500 laser diffractometer to have values $D_{90}$=92.3 μm; $D_{50}$=45.3 μm; D10=24.7 μm. The plot by volume is shown in FIG. 2.

Scanning Electron Micrography (SEM). SEM images in FIG. 1 reveals spheroidal, partially agglomerated particles of a typical size in agreement with PSD results.

Figure 3:
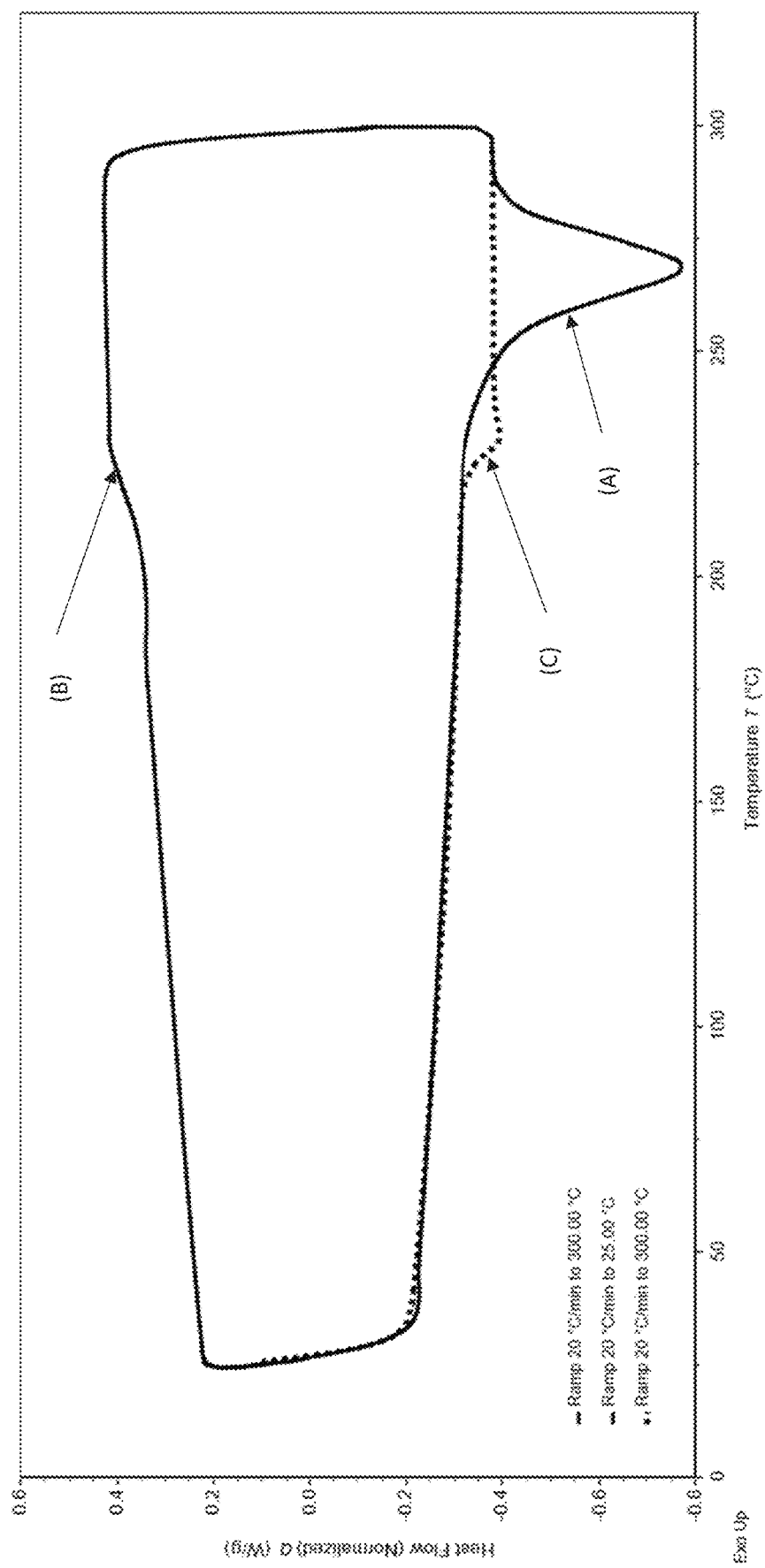
FIG. 3 is a differential scanning calorimetry plot of the polyarylethersulfone of this invention.

Differential Scanning calorimetry (DSC). The DSC was performed at a scan rate of 20° C./min. A glass transition was observed at 226.22° C., followed by the onset of melting at 253.41° C. which peaked at 268.79° C. (see (A) in FIG. 3). The enthalpy of fusion was determined to be 21.963 J/g. Recrystallization was not evident upon cooling; however, a glass transition appeared at 221.39° C. (see (B) in FIG. 3), and again upon secondary heating at 226.22° C. (see (C) in FIG. 3), after which no melting behavior was observed, as shown in FIG. 3.

Percent Crystallinity. The percent crystallinity of semicrystalline PPSU powder was determined by powder x-ray diffraction to be 49.76%. From this value and the measured enthalpy of fusion, it may be estimated that the enthalpy of fusion for a 100% crystalline sample of PPSU is 44.14 J/g.

SLS Printing of Semicrystalline PAES Powder. The semicrystalline PPSU powder of Example 1 was utilized in the laser sintering process on a Farsoon ST252P laser sintering system. Three kilograms of the semicrystalline PPSU was loaded into the feed piston of the machine and settled into the piston achieving the optimal tapped density using a cement vibrator. Under an inert nitrogen atmosphere, material was moved from the feed piston to the part piston in a layer-wise fashion using a counter-rotating roller at layer thicknesses of 0.100 mm. Layers were laid at 90-second intervals in order to allow for sufficient thermal absorption from near-IR heaters, during which time the temperature of the feed piston ramped from 60° C. to 180° C. and the part bed temperature ramped from 60° C. to 207° C. Once the part bed temperature reached the set point of 207° C., part areas were exposed using the following scanning system parameters in order to melt selected areas into solid parts are shown in Table 1:

TABLE 1

| Laser spot size (μm) | 450 |
| Fill scan speed (mm/s) | 10,160 |
| Fill scan spacing (mm) | 0.28 |
| Fill laser power (W) | 30 |

Parts produced included thin discs, crosses, "window" test coupons, and ASTM D638 Type IV tensile bars. Parts were translucent with a yellow-brown tint and displayed no discernable deformation by eye. The PAES in the formed part was amorphous.

What is claimed is:

1. A method of forming a semicrystalline polyarylethersulfone comprising:
   (i) dissolving an initial polyarylethersulfone that is amorphous or has a crystallinity of less than about 30% by weight in a polar aprotic halogenated hydrocarbon solvent at a temperature to form a solution with dissolved polyarylethersulfone, and
   (ii) precipitating spontaneously the dissolved polyarylethersulfone from the solution to form the semicrystalline polyarylethersulfone, wherein, when the initial polyarylethersulfone is amorphous the semicrystalline polyarylethersulfone has a crystallinity of at least about 10% to about 100% and when the initial polyarylethersulfone has a crystallinity of less than 30%, the crystallinity of the semicrystalline polyarylethersulfone is at least about 20% greater than the crystallinity of the initial polyarylethersulfone.

2. The method of claim 1, wherein the temperature is about the same throughout the method.

3. The method of either claim 2, wherein the temperature is held within +5° C.

4. The method of claim 1, wherein the temperature is from about 20° C. to about 60° C.

5. The method of claim 1, wherein the solvent is comprised of a halogenated hydrocarbon having from 1 to 3 carbons.

6. The method of claim 5, wherein the solvent is comprised of dichloromethane.

7. The method of claim 1, wherein the dissolving and precipitating is performed at ambient conditions.

8. The method of claim 1, wherein the initial polyarylethersulfone has a crystallinity of at most 15% by weight.

9. The method of claim 1, wherein the initial polyarylethersulfone is amorphous.

10. The method of claim 1, wherein the initial polyarylethersulfone is comprised of one represented by:

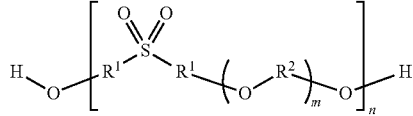

wherein n is an integer value such that the polyarylethersulfone has a weight average molecular weight of about 30 to 200 kDa, m is from 0 to 10, $R^1$ is an aryl group having from 5 to 10 carbons, $R^2$ in each occurrence is independently $C_1$-$C_{20}$ alkyl, $C_5$-$C_{18}$ aryl or fused ring of 5-10 carbon atoms.

11. The method of claim 10, wherein —$R^1$—S(=O)$_2$—$R^1$— is represented by:

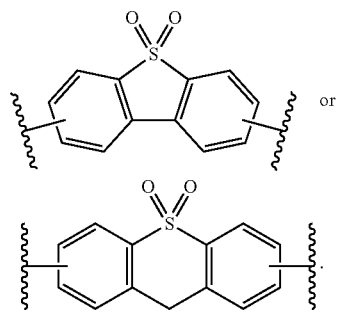

12. The method of claim 1, wherein the semicrystalline polyarylethersulfone has a crystallinity of greater than 30% to 60% by weight.

13. The method of claim 10, wherein the initial polyarylethersulfone is comprised of one or more of a polyethersulfone, poly (1,4-phenylene-ether-ether-sulfone, polyphenylenesulfone, and poly (bisphenol-A-sulfone).

14. A method of forming a semicrystalline polyarylethersulfone comprising:
(i) dissolving an initial polyarylethersulfone that is amorphous or has a crystallinity of less than about 30% by weight in a polar aprotic halogenated hydrocarbon solvent at a temperature to form a solution with dissolved polyarylethersulfone, and
(ii) precipitating by cooling the dissolved polyarylethersulfone from the solution to form the semicrystalline polyarylethersulfone, wherein, when the initial polyarylethersulfone is amorphous the semicrystalline polyarylethersulfone has a crystallinity of at least about 10% to about 100% and when the initial polyarylethersulfone has a crystallinity of less than 30%, the crystallinity of the semicrystalline polyarylethersulfone is at least about 20% greater than the crystallinity of the initial polyarylethersulfone.

15. The method of claim 14, wherein the temperature is from about 20° C. to about 60° C.

16. The method of claim 15, wherein the cooling does not exceed cooling arising from allowing the solution to cool under ambient conditions.

17. The method of claim 14, wherein the initial polyarylethersulfone is amorphous.

18. The method of claim 16, wherein the initial polyarylethersulfone is comprised of one represented by:

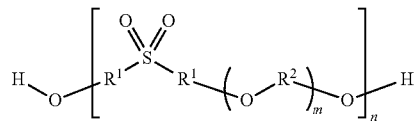

wherein n is an integer value such that the polarylethersulfone has a weight average molecular weight of about 30 to 200 kDa, m is from 0 to 10, $R^1$ is an aryl group having from 5 to 10 carbons, $R^2$ in each occurrence is independently $C_1$-$C_{20}$ alkyl, $C_5$-$C_{18}$ aryl or fused ring of 5-10 carbon atoms.

19. The method of claim 18, wherein —$R^1$—S(=O)$_2$-$R^1$— is represented by:

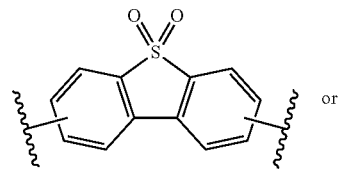 or

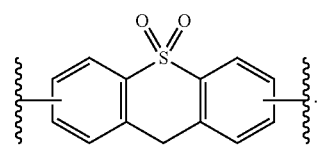.

20. The method of claim 18, wherein the initial polyarylethersulfone is comprised of one or more of polyethersulfone, poly (1,4-phenylene-ether-ether-sulfone, polyphenylenesulfone, and poly (bisphenol-A-sulfone).

* * * * *